(12) United States Patent
Hillyard et al.

(10) Patent No.: US 10,378,707 B2
(45) Date of Patent: *Aug. 13, 2019

(54) SPA FIXTURE LIGHTING SYSTEM

(71) Applicant: B&S Plastics, Inc., Oxnard, CA (US)

(72) Inventors: Jason W. Hillyard, Fillmore, CA (US); Luis D. Fuentes, Santa Clarita, CA (US)

(73) Assignee: B&S PLASTICS, INC., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,662

(22) Filed: Oct. 15, 2018

(65) Prior Publication Data

US 2019/0086042 A1 Mar. 21, 2019

Related U.S. Application Data

(63) Continuation of application No. 14/666,159, filed on Mar. 23, 2015, now Pat. No. 10,145,523.

(60) Provisional application No. 61/969,740, filed on Mar. 24, 2014.

(51) Int. Cl.
| | |
|---|---|
| *A61H 33/04* | (2006.01) |
| *F21S 8/02* | (2006.01) |
| *A61H 33/00* | (2006.01) |
| *F21V 31/00* | (2006.01) |
| *F21V 8/00* | (2006.01) |
| *F21Y 115/10* | (2016.01) |
| *F21W 131/401* | (2006.01) |

(52) U.S. Cl.
CPC ............ *F21S 8/024* (2013.01); *A61H 33/005* (2013.01); *A61H 33/0087* (2013.01); *A61H 33/6005* (2013.01); *F21V 31/005* (2013.01); *A61H 2033/0083* (2013.01); *A61H 2201/0111* (2013.01); *A61H 2201/0188* (2013.01); *F21W 2131/401* (2013.01); *F21Y 2115/10* (2016.08); *G02B 6/0006* (2013.01)

(58) Field of Classification Search
CPC .. F21S 8/024; A61H 33/005; A61H 333/0087
See application file for complete search history.

(56) References Cited

U.S. PATENT DOCUMENTS

| | | |
|---|---|---|
| 5,850,640 A | 12/1998 | Pinciaro |
| 5,920,924 A | 7/1999 | Pinciaro |
| 6,094,754 A | 8/2000 | Pinciaro |
| 6,453,484 B1 | 9/2002 | Pinciaro |
| 8,042,962 B2 | 10/2011 | Fuentes et al. |
| 2005/0120473 A1 | 6/2005 | Southon et al. |

(Continued)

OTHER PUBLICATIONS

CMP, New: 2015 CMP Spa Products Catalog, Jan. 16, 2015, available at: http://www.c-m-p.com/new-2015-cmp-spa-products-catalog/.

(Continued)

*Primary Examiner* — Lauren A Crane

(74) *Attorney, Agent, or Firm* — Brooks Acordia IP Law, PC; Michael Zarrabian

(57) ABSTRACT

A spa fixture lighting system assembly includes a wall-fitting nut having a threaded inner circumferential portion and an interior radial seat, and a light source disposed on a light source seat selected from the group consisting of the interior radial seat, an exterior radial sidewall of the wall-fitting nut, or an exterior circumferential sidewall of the wall-fitting nut.

22 Claims, 18 Drawing Sheets

(56) References Cited

U.S. PATENT DOCUMENTS

2006/0112482 A1 6/2006 Walker et al.
2011/0164400 A1 7/2011 Kownacki et al.
2012/0174312 A1 7/2012 Loyd et al.

OTHER PUBLICATIONS

SQR System, 2015 CMP Spa Products Catalog, Jan. 16, 2015, p. 13, CMP, United States.
SQR Topside Valves, 2017 CMP Spa Products Catalog, Sep. 7, 2016, p. 22, CMP, United States.

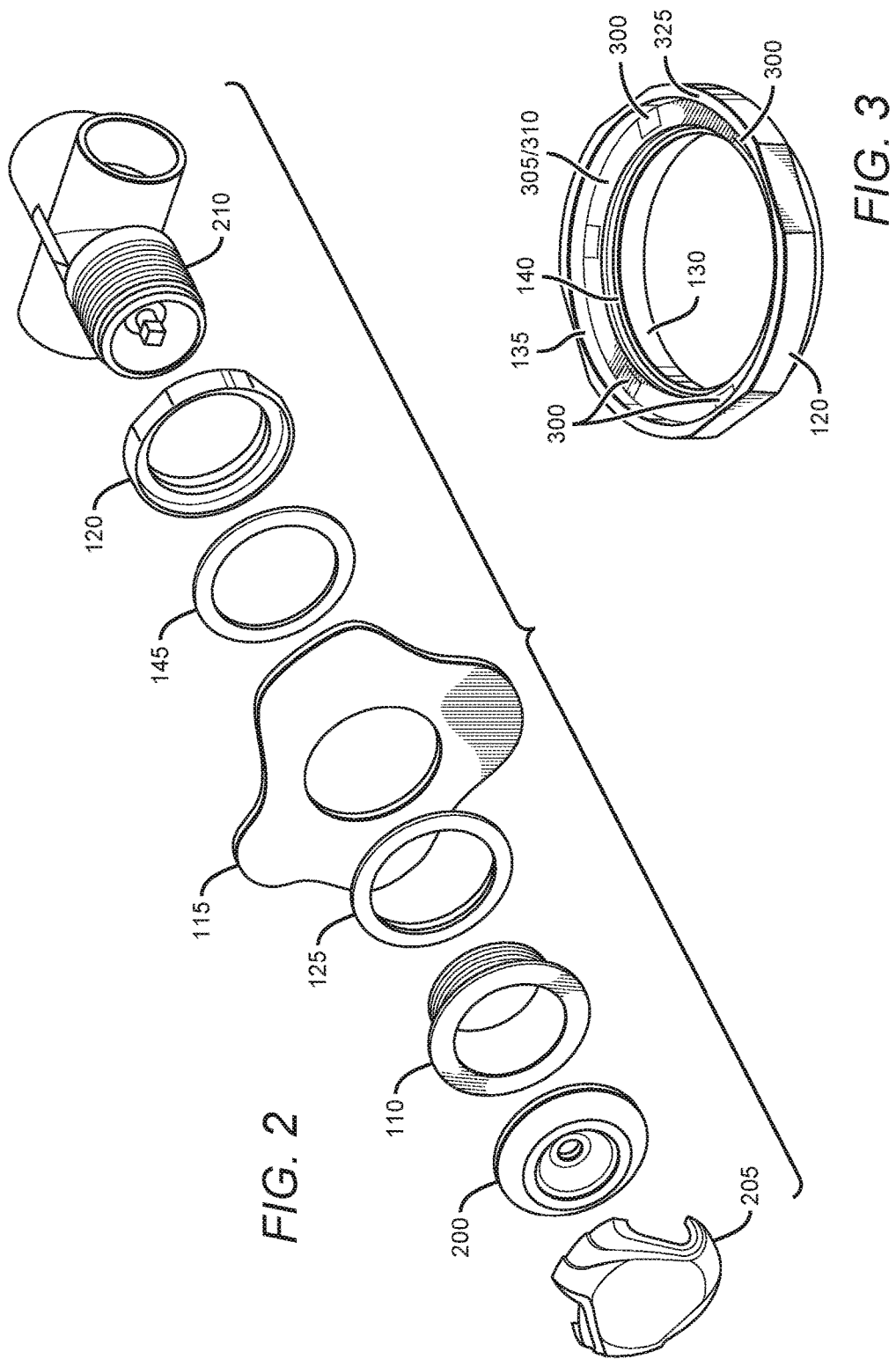

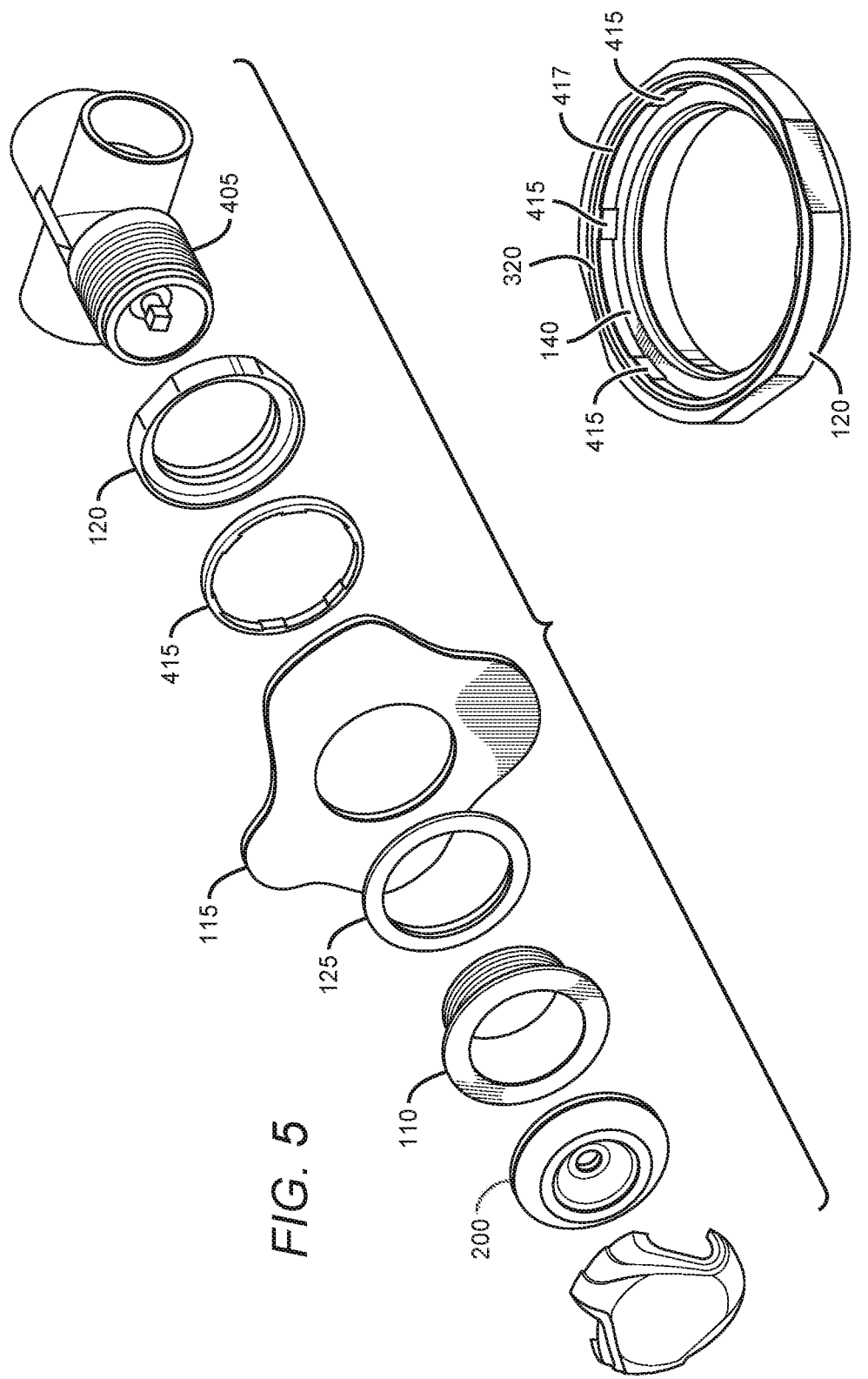

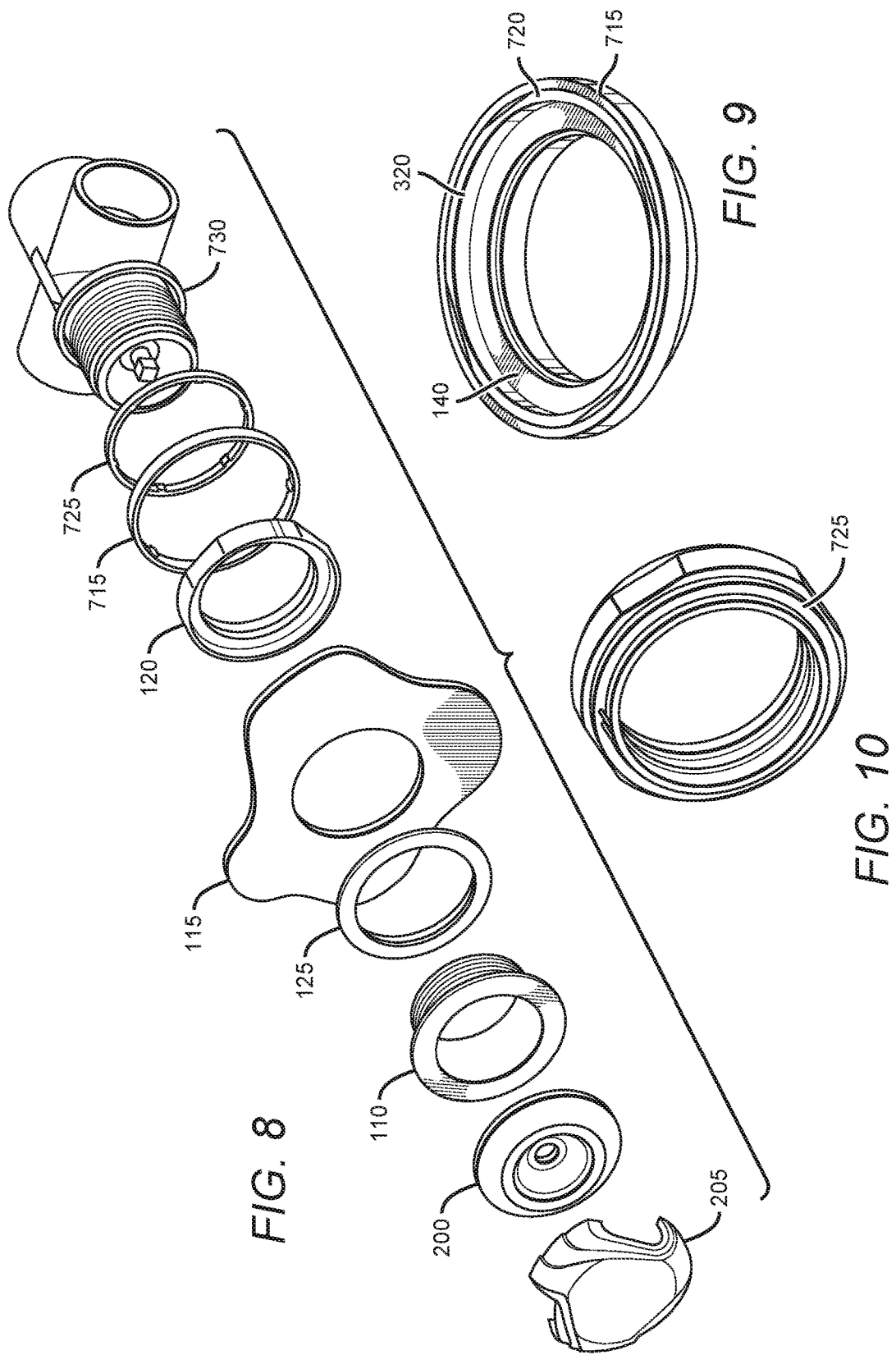

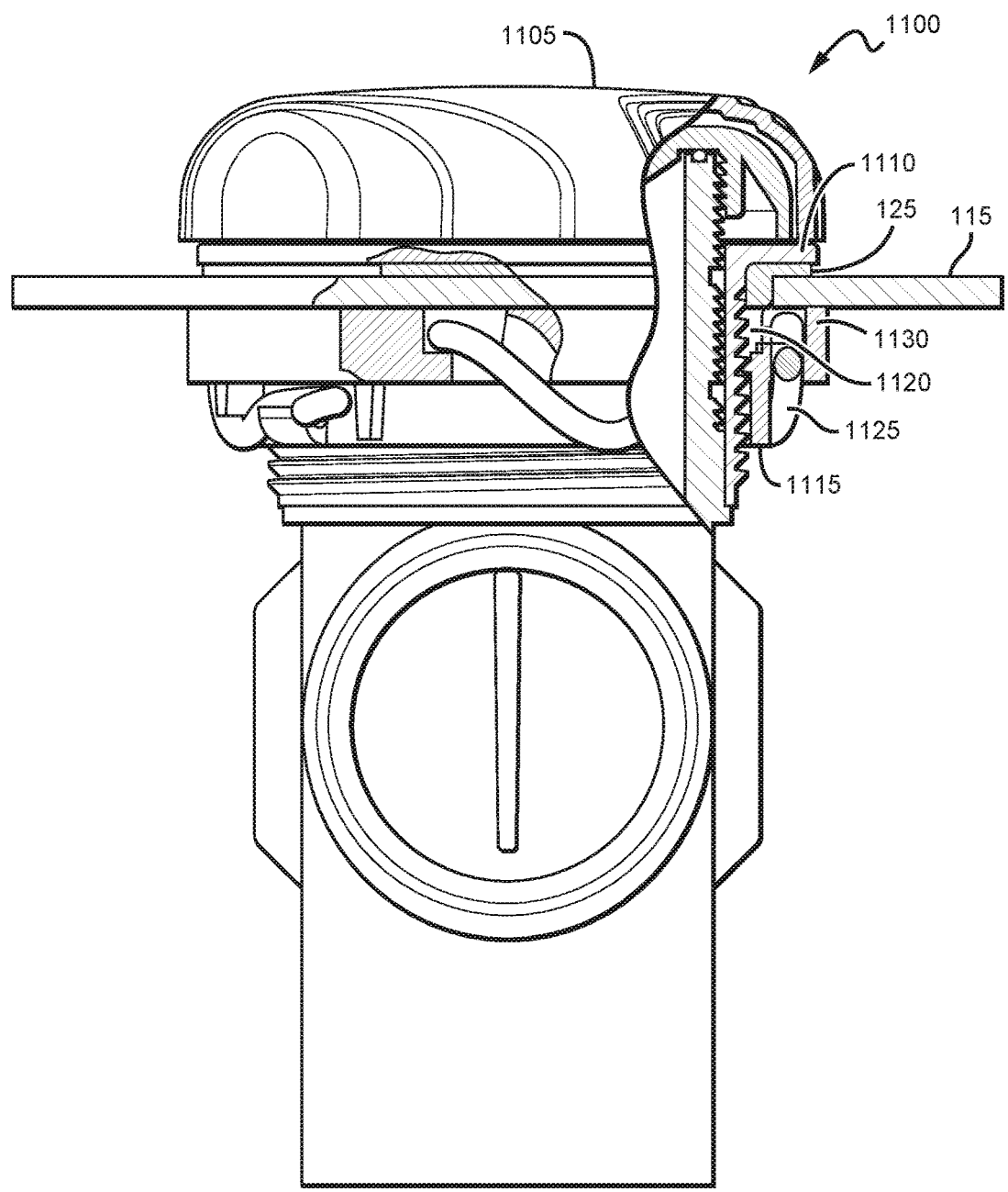

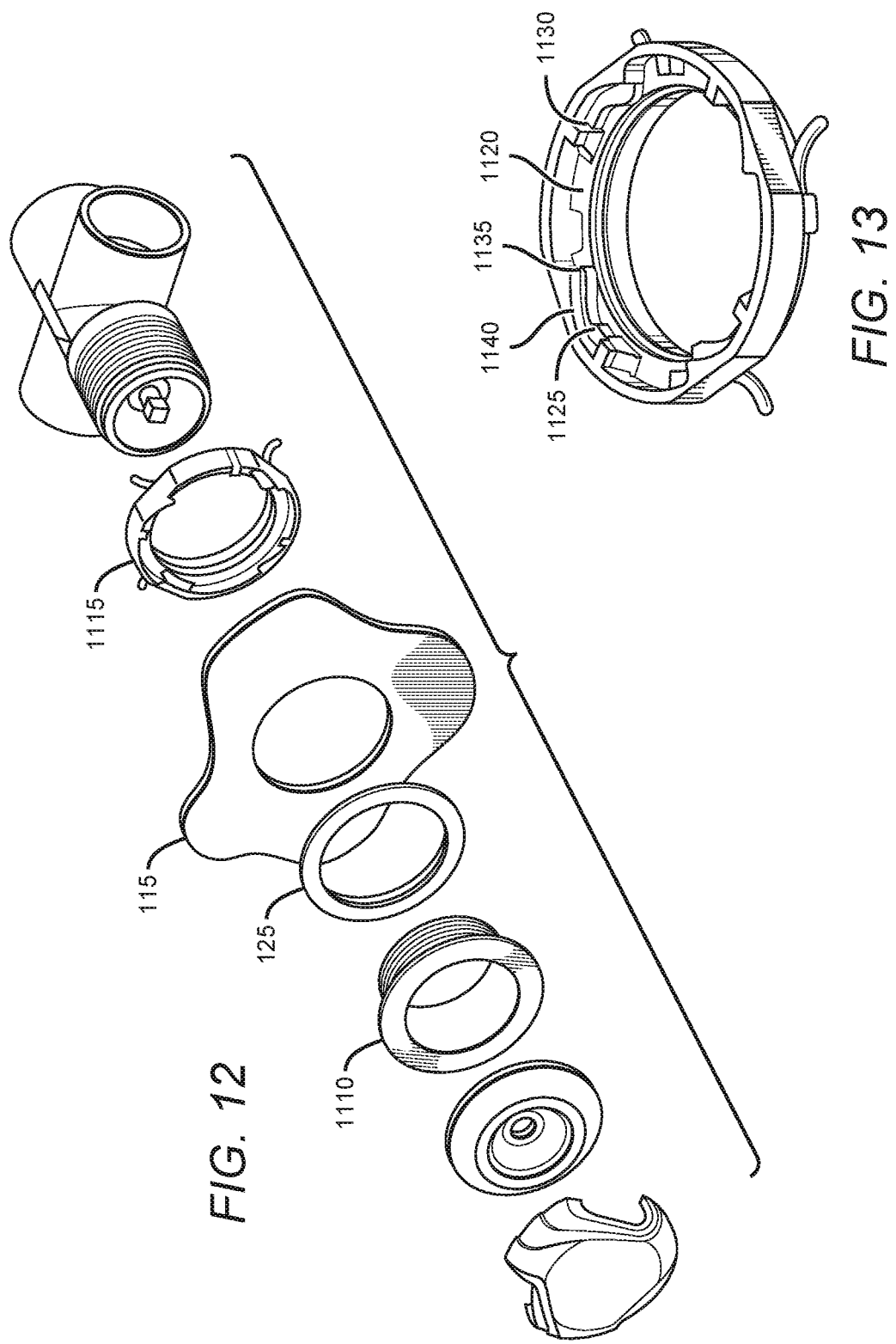

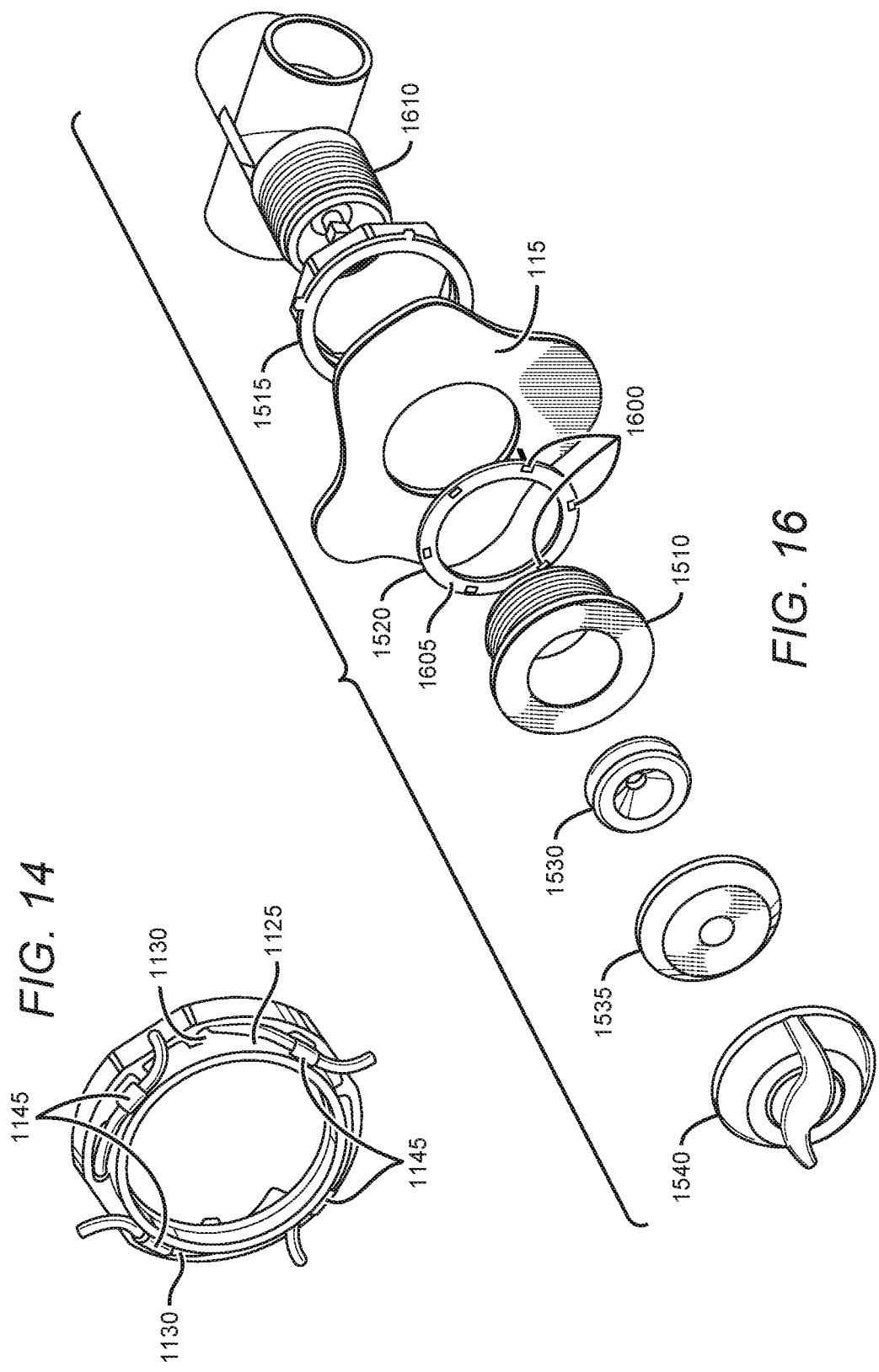

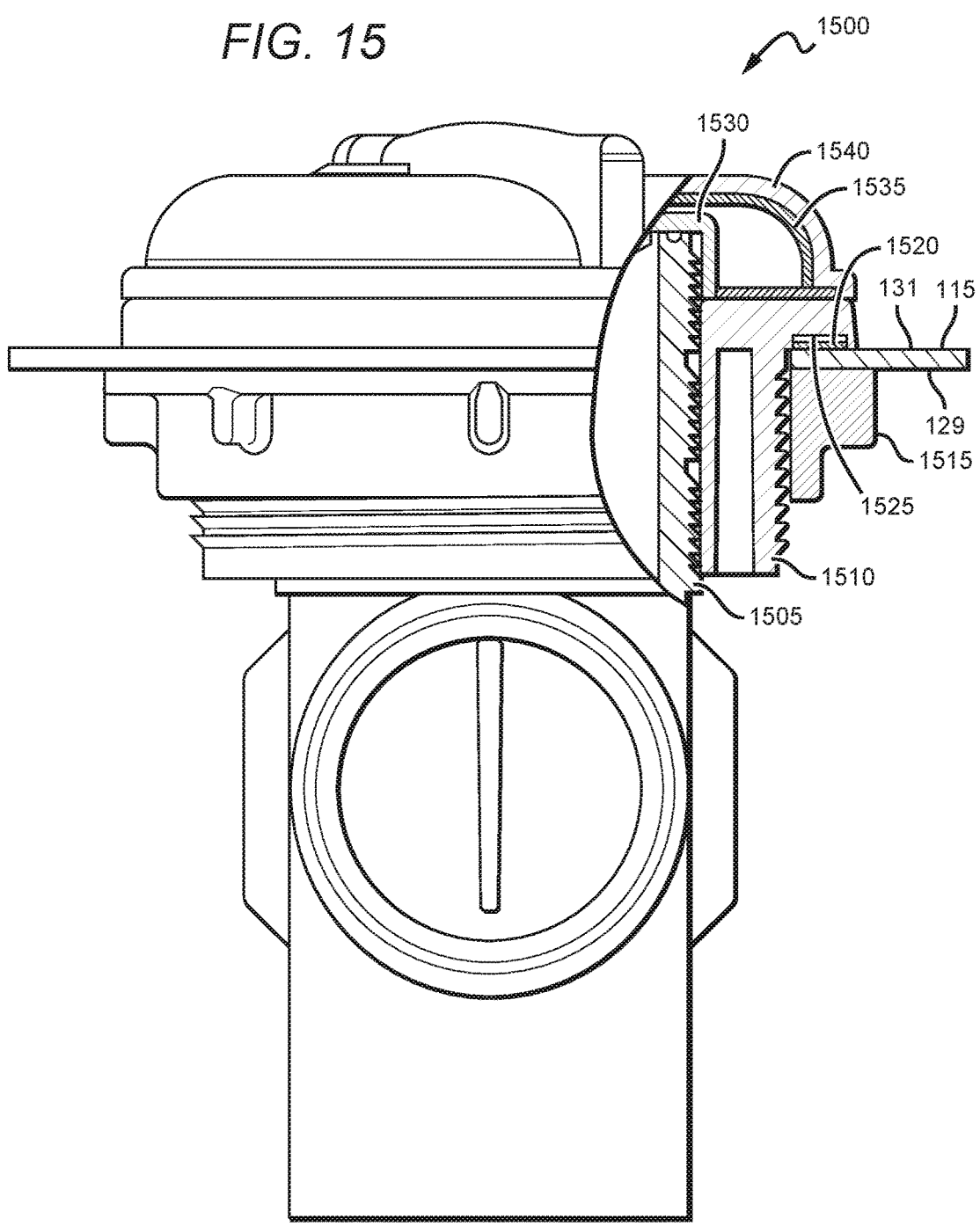

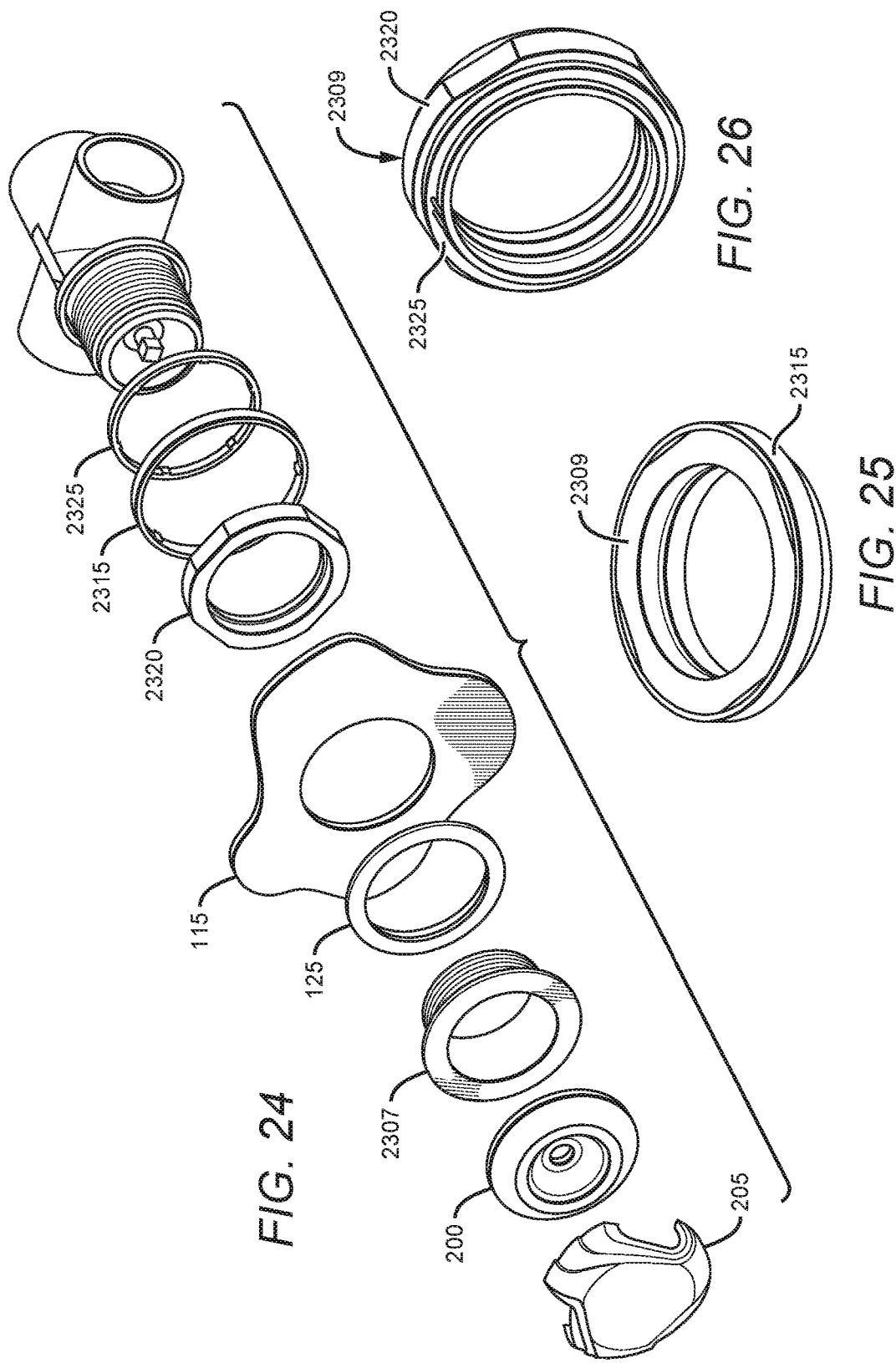

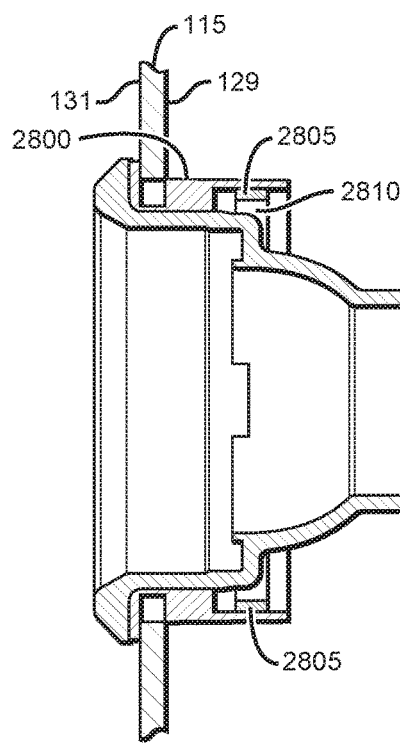
FIG. 28
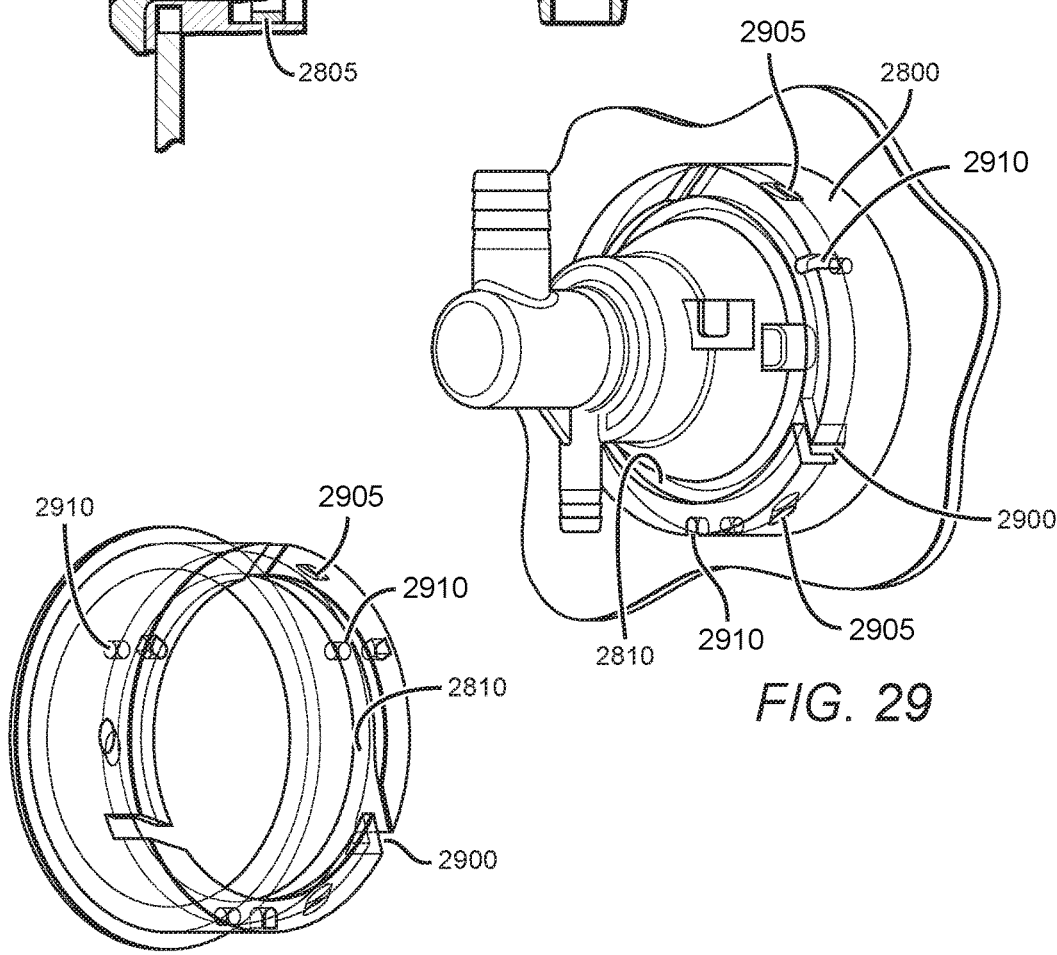
FIG. 29
FIG. 30

SPA FIXTURE LIGHTING SYSTEM

CROSS-REFERENCE TO RELATED APPLICATIONS

This application is a continuation of Nonprovisional patent application Ser. No. 14/666,159 filed Mar. 23, 2015, which claims priority to and benefit of Provisional Patent Application No. 61/969,740 filed Mar. 24, 2014, the contents of all of which are hereby incorporated by reference herein for all purposes.

BACKGROUND

Field of the Invention

This invention relates to lighting systems, and more particularly to spa fixture lighting systems.

Description of the Related Art

Spa designers and manufacturers may provide useful lighting for spa control panels, water features and the interior seating area of spa tubs. A need continues to exist to provide useful lighting in spa systems.

SUMMARY

A spa fixture lighting system may include a wall-fitting nut having a threaded inner circumferential portion and an interior radial seat and a light source disposed on a light source seat selected from the group consisting of the interior radial seat, an exterior radial sidewall of the wall-fitting nut, or an exterior circumferential sidewall of the wall-fitting nut. The system may also include a spa shell wall engaged with the wall-fitting nut, a wall fitting extending through the spa shell wall and coupled to the wall-fitting nut, and a light reflection cavity disposed between the wall-fitting nut, wall fitting and the spa shell wall and positioned to receive light emitted by the light source. The light reflection cavity may be formed as a void or of a light transmissive material. In some embodiments, the system may include a light pipe in direct optical communication with the light reflection cavity and extending through a spa shell wall so that light emitted from the light source and received by the light reflection cavity is introduced to the light pipe for transmittance of the light through the light pipe. In such embodiments, the light pipe may be the wall fitting engaged with the threaded inner circumferential portion and/or a light transmissive gasket disposed between the spa shell wall and the wall fitting. In other embodiments, the wall-fitting nut may have a plurality of light emitting diode (LED) ports for receiving a respective plurality of LEDs. The wall-fitting nut may also have an LED guide ramp adjacent each respective LED port, each LED guide ramp having a sloping guide surface configured to guide an LED directed through the LED port to face a radial interior of the wall-fitting nut.

A spa fixture lighting system assembly is also disclosed that has a spa shell wall having a water side and a backside, a light transmissive wall fitting extending through the spa shell wall from the water side to the backside, the light transmissive wall fitting having a circumferential recess, and a plurality of lights spaced circumferentially in the circumferential recess. In some embodiments, the plurality of lights may be spaced circumferentially immediately adjacent to the water side and/or spaced circumferentially on a side of the light transmissive wall fitting that is opposite from the water side of the spa shell wall. The light transmissive wall fitting may be a spa shell grommet, and the system may include a spa fixture such as a jet or valve body seated in the spa shell wall grommet with a compression fit so that the compression fit provides the spa shell wall grommet with a compression fit with the spa shell wall. In such embodiments, the lights may be spaced circumferentially about a longitudinal axis of the spa shell grommet.

Another spa fixture lighting system is disclosed that includes a spa shell wall having a water side and a backside, a wall fitting extending through the spa shell wall, a wall-fitting coupler coupled to the wall fitting, the wall-fitting coupler having first and second inner circumferential portions, the second inner circumferential portion having a larger circumference than the first inner circumferential portion, and an interior radial seat joining the first and second circumferential portions, and a light reflection cavity disposed between the wall-fitting coupler, wall fitting, and spa shell wall so that light projected into the light reflection cavity is reflected within the light reflecting cavity for more uniform redistribution of the light through the system. In some embodiments, the light reflection cavity includes an atmospheric void. In others, the light reflection cavity includes light transmissive plastic such as clear plastic. Other embodiments may include a light source disposed in the light reflection cavity and may be configured so that the light source is disposed on the interior radial seat. Alternatively, the light source may be disposed on the second inner circumferential portion and the light source may include a plurality of light-emitting diodes (LEDs). Each of the plurality of LEDs may be disposed on a flexible disk, on an inner diameter of a flexible ring, or disposed on a respective flexible cable. If disposed on a respective flexible cable, then the wall-fitting nut may have a plurality of cable ports, with each of the plurality of cable ports accepting a respective one of the plurality of flexible cables. In some embodiments, a light-transmissive gasket may be disposed between the spa shell wall and wall fitting adjacent the light reflection cavity, so that a portion of the light reflected by the wall fitting is transmitted through the light reflection cavity and into the light-transmissive gasket. Embodiments may also be configured so that the wall fitting includes a light transmissive material so that a portion of the light reflected by the wall fitting is transmitted through the light reflection cavity and into the light-transmissive wall fitting. In an embodiment, a first light source may be disposed on an exterior radial sidewall of the wall-fitting nut, the exterior radial sidewall being on a side of the wall fitting opposite from the second inner circumferential portion. Such embodiment may also include a second light source disposed on an exterior circumferential sidewall of the wall-fitting nut, the second exterior side being on a side of the wall fitting opposite from the step portion, and may include a third light source spaced apart from the wall-fitting nut but directed toward the wall-fitting nut and wall fitting.

BRIEF DESCRIPTION OF THE DRAWINGS

FIG. 2 is an exploded perspective view illustrating the spa fixture of FIG. 1;

FIG. 3 is a perspective view of the light source disposed on a step portion of the wall-fitting nut first illustrated in FIG. 1;

FIG. 5 is an exploded perspective view illustrating the spa fixture of FIG. 4;

FIG. 6 is a perspective view of the light source disposed on the wall-fitting nut first illustrated in FIG. 4;

FIG. 8 is an exploded perspective view illustrating the fixture of FIG. 7;

FIG. 9 is a perspective view of the first light source disposed on an exterior side of the wall-fitting nut;

FIG. 10 is a perspective view of the second light source disposed on another exterior side of the wall-fitting nut;

FIG. 11 is another embodiment of a spa fixture having a light reflection cavity formed between a wall-fitting nut and a wall fitting, with a plurality of LED lights extending into the light reflection cavity through respective LED ports;

FIG. 12 is an exploded perspective view of the fixture illustrated in FIG. 11;

FIG. 13 is a perspective view illustrating the wall fitting first illustrated in FIG. 11 and showing a plurality of LEDs on flexible cables passing through respective cable ports into the light reflection cavity;

FIG. 14 is a perspective view illustrating a backside of the wall fitting nut and illustrating flexible cables passing through respective cable ports;

FIG. 15 is a partial cutaway view illustrating another embodiment of a stock fixture having a wall fitting coupled to a spa shell wall using a wall fitting nut, and having a light source disposed between the wall fitting and spa shell;

FIG. 16 is an exploded perspective view of the fixture illustrated in FIG. 15;

FIGS. 23-26 illustrate another embodiment of a fixture assembly that includes a plurality of light sources disposed on exterior circumferential surfaces of a wall fixture nut and adjacent to the wall fixture nut, with the wall fixture nut having a solid-core light reflection cavity;

FIG. 27 is an assembled perspective view of the assembly and components illustrated in FIGS. 24-26

FIGS. 28-30 illustrate one embodiment of a fixture assembly that uses a light reflection cavity embedded in a spa shell wall grommet for transmission of diffused light through a spa shell wall.

DETAILED DESCRIPTION

A system is disclosed that provides for more uniform accent lighting of a fixture extending through a spa shell wall. The inventive system serves to diffuse light presented from discrete light sources located on the backside of a spa shell wall for transmission to a front side of the spa shell wall to accent the perimeter or decorative top of a spa fixture. The components of the system may include a wall-fitting coupler such as a wall-fitting nut positioned on a back side of the spa shell wall or a spa shell wall grommet extending through the spa shell wall and each forming an interior light reflection cavity. Light received in the light reflection cavity diffuses the light for presentation to the front side of the spa shell wall for a variety of spa fixtures requiring accent lighting, including hydrotherapy jets, diverter valves and spa control panels.

Figure 1A:
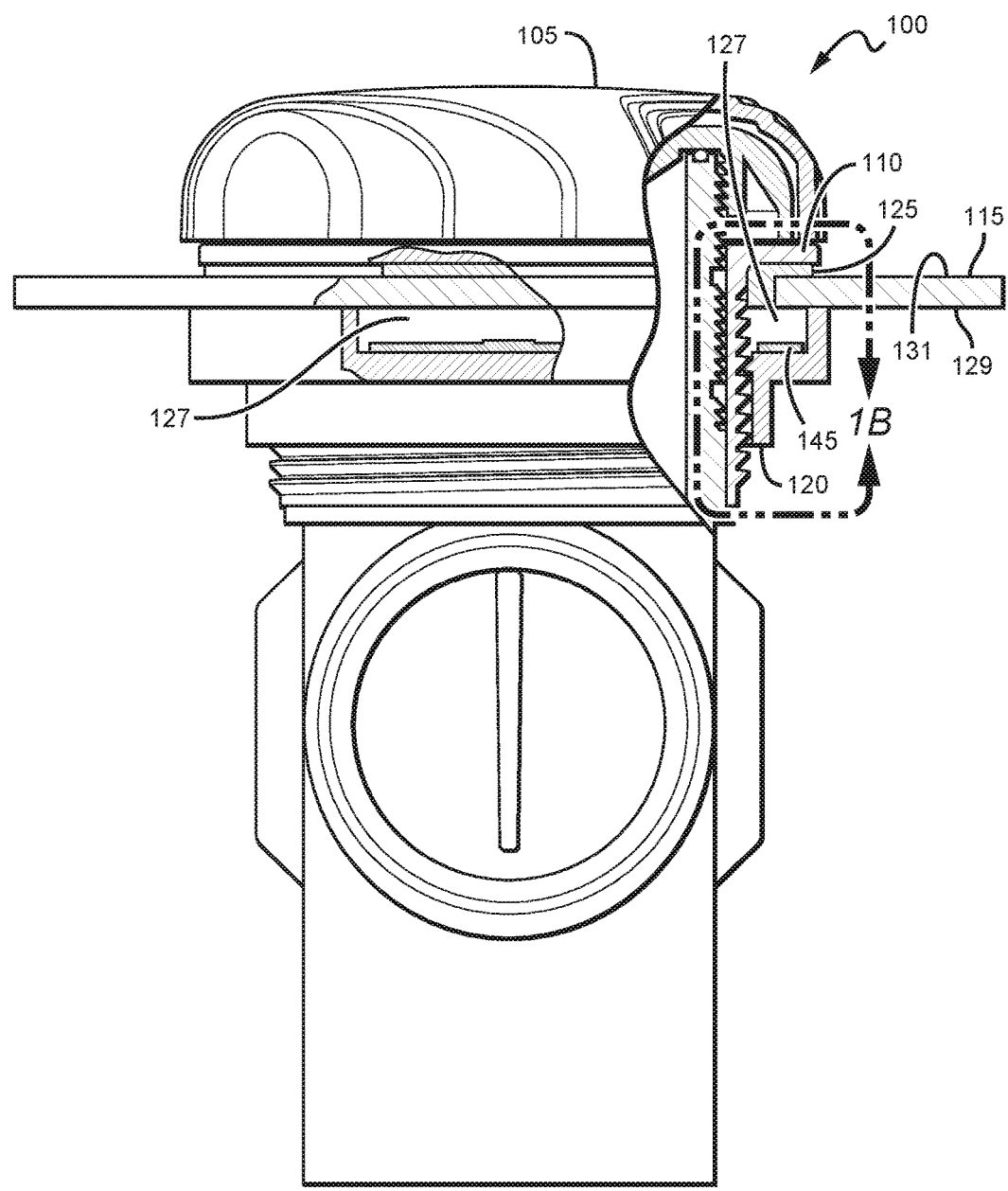
FIG. 1A is a partial cutaway view illustrating one embodiment of a spa fixture having a wall fitting coupled to a wall-fitting nut that collectively form a light reflection cavity for a light source disposed in the light reflection cavity.

FIG. 1A is a partial cutaway view of a fixture assembly that includes a light source disposed in a light reflection cavity to provide the fixture assembly with uniform accent lighting on the water side of a spa shell wall. The spa fixture assembly 100 may have a fixture 105 that is threadably coupled to a wall fitting 110, with the wall fitting 110 sized to pass through a hole in a spa shell wall 115. The wall fitting 110 may be coupled to the spa shell wall 115 by a wall-fitting coupler such as a wall fitting nut 120 engaging with the spa shell wall 115. A light transmissive gasket such as clear gasket 125 may be disposed between the wall fitting 110 and the spa shell wall 115 to provide a watertight seal and a light transmission path between them. A light reflection cavity 127 may be defined by the volume encompassed by the wall-fitting nut 120, wall fitting 110, and the spa shell wall 115 so that a portion of the light reflected by the wall-fitting nut 120 is transmitted through the light reflection cavity for further reflection into the clear gasket 125 for more uniform transmission of the light from a backside 129 to a water side 131 of the spa shell wall 115.

Figure 1B:
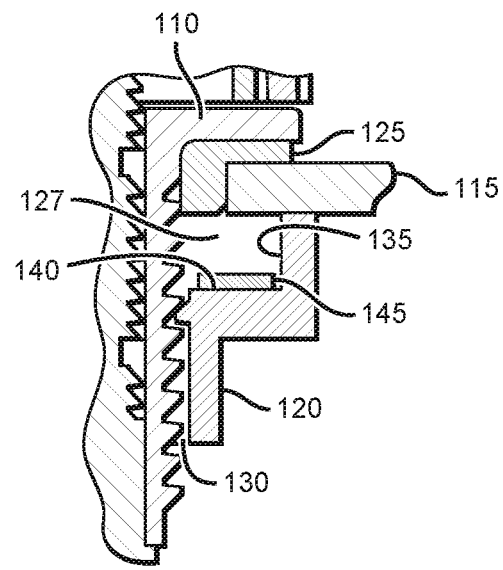
FIG. 1B is cross sectional view of the area identified in FIG. 1.

FIG. 1B is a close-up perspective view of the area identified in FIG. 1A as area 1B. The wall-fitting nut 120 may have a first threaded inner circumferential portion 130 and a second inner circumferential portion 135 that is larger in diameter than the first threaded inner circumferential portion 130. A interior radial seat 140 (alternatively referred to as one embodiment of a "light source seat" or "inner diameter ("ID") recess") extends between the first and second inner diameter portions (130, 135) and may act as a light source seat for a light source 145 such as an LED or preferably a plurality of LEDs spaced apart circumferentially and affixed to a flexible disk to form an LED strip (see FIGS. 2, 3) that may support electrical connections between LEDs. The wall fitting 110 may be threadably coupled to the wall-fitting nut 120. Wall-fitting nut 120 is preferably opaque such as white PVC material to act as a reflector for the light reflection cavity 127. The wall-fitting nut 120 may also be of another color or material and may be covered with a reflective film or other reflecting body (not shown). The wall fitting 110 is preferably formed a light transmissive material such as clear plastic or may be opaque such as white plastic. The gasket 125 is preferably formed of clear material to transmit light received from the light reflection cavity 127 or the light source 145. The wall fitting 110 and gasket 125 may collectively or individually be referred to as a light pipe to transmit light. In some embodiments, the gasket 125 may be omitted from the fixture assembly 100. In an alternative embodiment, the light reflecting cavity 127 may be partially or completely formed of or filled with a light-transmissive material such as clear plastic or of plastic having a colored pigment rather than being formed of an atmospheric void having air.

Figure 1C:
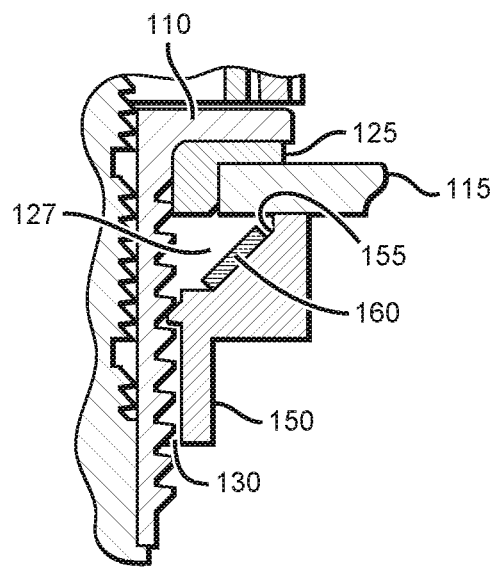
FIG. 1C is a cross sectional view of another embodiment of the components illustrated in FIG. 1B.

FIG. 1C illustrates another embodiment of a wall fitting coupler that is a wall-fitting nut 150 having an interior radial seat portion used to create a light reflection cavity. In this embodiment, an interior radial seat portion may be a concave reflective surface 155 and may act as both a light source seat and reflector for the light reflection cavity 127, fitting 110 and/or clear gasket 125. In further embodiments, rather than forming a concave reflective surface, the interior radial seat portion may be a planar reflective surface or non-planar reflective surface may be used to better reflect light into the wall fitting 110 and/or clear gasket. A light source 160, such as a plurality of LEDs spaced apart and affixed to a flexible disk, may be seated on the interior radial seat portion that may be in the form of a concave reflective surface 155. The wall fitting 110 may be threadably coupled to the wall-fitting nut 150. The wall-fitting nut 150 is preferably opaque such as white PVC material. The wall-fitting nut 150 may also be of another color or material and may be covered with a reflective film or other reflecting body (not shown). Although described in terms of a wall fitting nut 150, in other embodiments, the wall fitting coupler may be a component that couples with the wall fitting using a friction fit, such as a star washer or its functional equivalent, or using a slip fit with adhesive or compression, rather than coupling using threads.

FIG. 2 is an exploded perspective view of the fixture assembly first illustrated in FIG. 1A. A clear or white wall fitting 110 may be seated on a clear L-shaped gasket 125 that provides a waterproof seat between the wall fitting 110 and the spa shell wall 115. A transparent or semi-transparent (i.e., color pigmented or neutral-density filtered) threaded cap 200 is threadably seated in the wall fitting 110 and may receive and transmit a portion of the light received from either the clear gasket 125 or clear wall fitting 110 or both. A decorative handle 205 is coupled to the threaded cap 200. A valve body 210 may be threadably coupled to the wall fitting 110, with the wall-fitting nut 120 threadably coupled to the wall fitting 110 to hold the resulting assembly to the spa shell wall 115. The light source 145, such as the LED strip referenced in FIG. 3, may be seated in the interior radial seat 140 of the wall-fitting nut 120. In an alternative embodiment, the L-shaped gasket 125 may be omitted so that light emitted from the light source 145 is transmitted through the wall fitting 110.

FIG. 3 illustrates one embodiment of a wall fitting that has an LED strip seated on a step portion of a wall-fitting nut. The wall-fitting nut 120 may have a light source consisting of a plurality of LEDs 300 spaced apart and affixed to a flexible disk 305 providing electrical communication between them to define an LED strip 310 disposed on the interior radial seat 140 of the wall-fitting nut 120. The LED strip 310 may be disposed on the interior radial seat 140 such as with an adhesive. In an alternative embodiment, the flexible disk 305 may be omitted and the LEDs seated directly on the interior radial seat 140. The wall-fitting nut may have the first and second inner circumferential portions (130, 135) with the second inner circumferential portion 135 having a larger circumference than the first inner circumferential portion 130, and the interior radial seat 140 joining the first and second circumferential portions (130, 135). The first inner circumferential portion 130 may be a threaded inner circumferential portion or may be smooth to facilitate adhesive joining. The portions of the interior radial seat 140 not otherwise covered by the LED strip 310 may function in concert with the second circumferential portion 135 to establish a light reflection cavity 127 (see FIGS. 1 and 2) when the wall-fitting nut 120 is seated on the spa wall (see FIGS. 1 and 2). Although the interior radial seat 140 is illustrated as perpendicular to the first and second inner circumferential portions (130, 135), the interior radial seat 140 may be formed as a lens, such as a concave or conical lens (not shown), to focus light emitted from the LED strip towards a center of the light reflection cavity. A light reflection strip may also be provided between the LEDs or disposed on one or both of the second circumferential portion 135 or interior radial seat 140 to reflect light emitted by the LEDs back towards a center of the light reflection cavity. A wall-fitting nut mating surface 325 is available to seat against a spa shell wall 115 (see FIGS. 1A and 1B). One or more notches (not shown) may be provided to enable passthrough of power wiring between interior and exterior portions of the wall-fitting nut 120.

Figure 4:
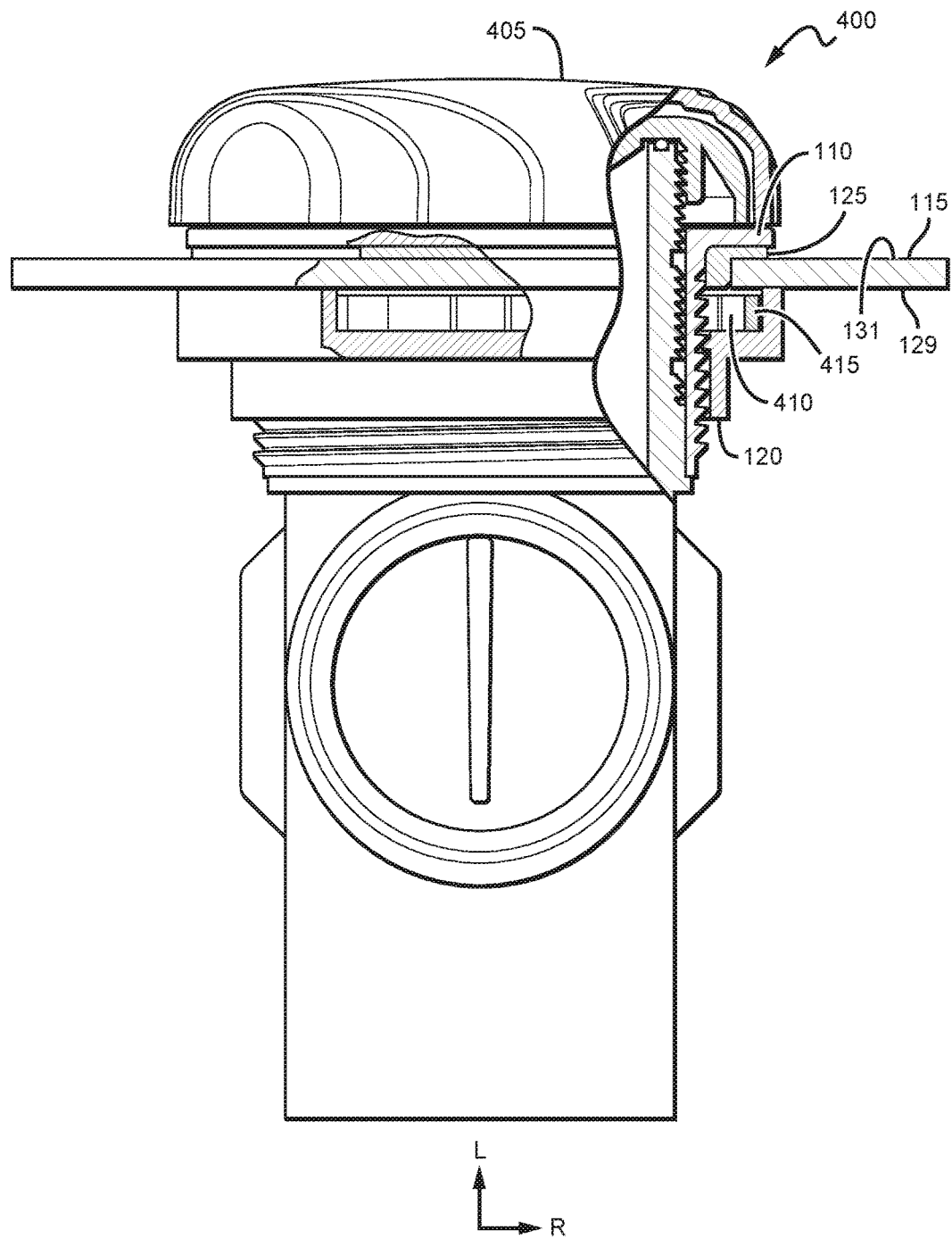
FIG. 4 is a partial cutaway view illustrating another embodiment of the fixture having a light source disposed in a light reflection cavity formed by a wall-fitting nut coupled to a wall fitting.
Figure 7:
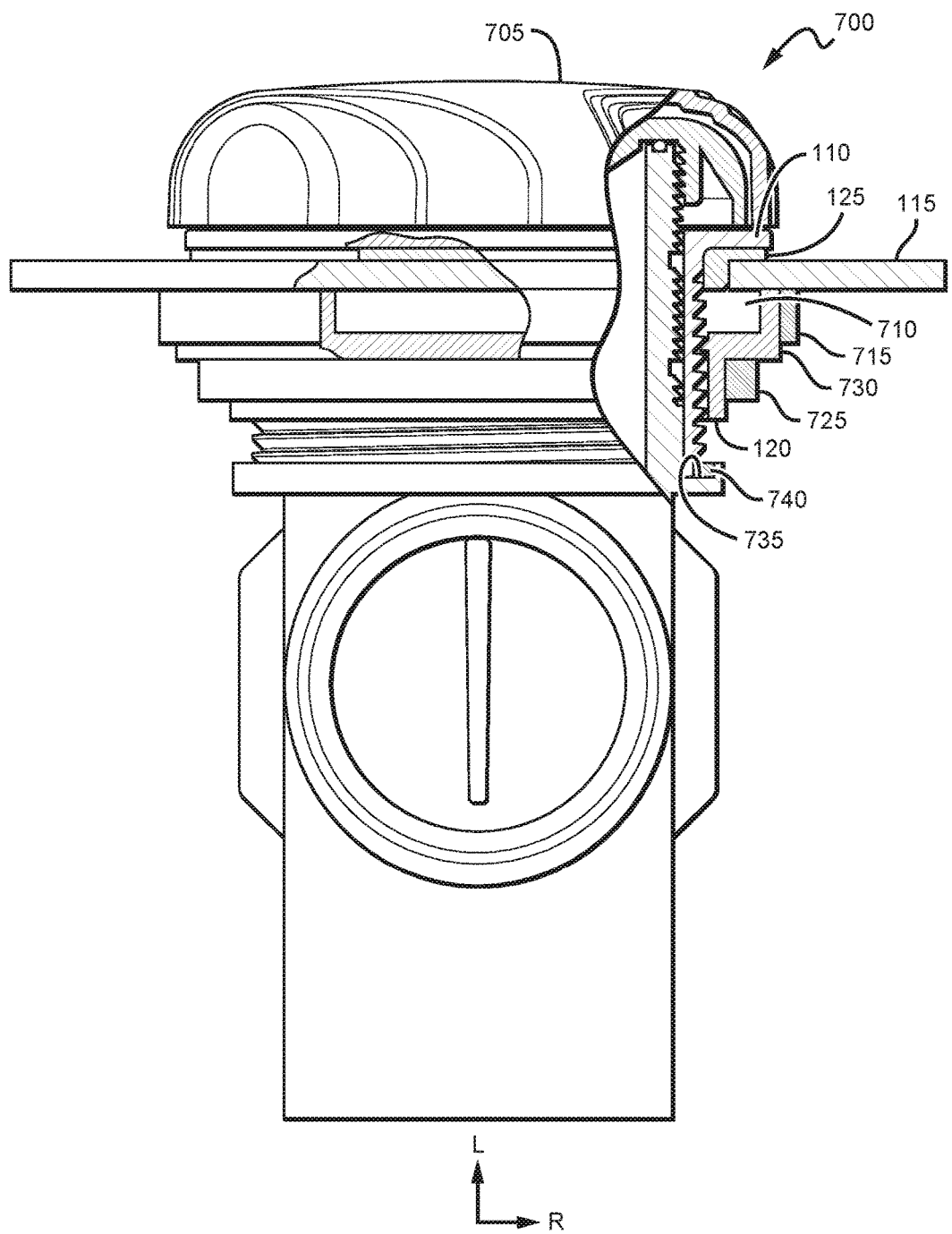
FIG. 7 is a partial cutaway view illustrating another embodiment of a spa fixture having a wall fitting coupled to a wall-fitting nut to form a light reflection cavity, and having a first and second light sources disposed on an exterior surface of the wall-fitting nut and having a third light source projecting through the wall fitting.

FIGS. 4-6 illustrate another embodiment of a fixture assembly that includes a light source disposed in a light reflection cavity, but unlike the longitudinal (L) light source arrangement illustrated in FIGS. 1-3, FIGS. 4-6 illustrate the light source emitting light in a radial (R) direction for reflection in the light reflection cavity to diffuse light transmitted through the spa wall. The spa fixture assembly 400 may have a fixture 405 that may be threadably or adhesively coupled to the wall fitting 110, with the wall fitting 110 clamped against the spa shell wall 115 by the wall-fitting nut 120. The clear gasket 125 may be disposed between the wall fitting 110 and the spa shell wall 115 to provide a watertight seal and a light transmission path. A light reflection cavity 410 may be defined by the volume encompassed by the wall-fitting nut 120, wall fitting 110, and the spa shell wall 115. A plurality of LED lights 415 may be seated on a flexible ring 417 seated on the second inner circumferential portion 320. A portion of the light emitted by the LED lights 415 is reflected by the wall-fitting nut 120 diffused throughout the light reflection cavity 410 for receipt and transmission into the clear gasket 125 and or the clear wall fitting 110 for more diffused and uniform transmission of the LED light past the spa shell wall 115 and either through the transparent or semi-transparent (i.e., color pigmented or neutral-density filtered) threaded cap 200 or about a perimeter of the fixture 405.

In an alternative embodiment, the second inner circumferential portion 320 is structurally replaced with a step portion that is angled (see FIG. 1C, step 160). For example, the second inner circumferential portion 320 may be formed as a lens, such as a concave or conical lens, to focus light emitted from the LED strip towards a center of the light reflection cavity. The wall fitting 110 is preferably formed of clear plastic or may be opaque such as white plastic if a clear gasket 125 is used. The gasket 125 is preferably formed of clear material to transmit light received from the light reflection cavity 410 or the light source 415 for more uniform transmission of the light from a backside 129 to a water side 131 of the spa shell wall 115. In an alternative embodiment, the light reflecting cavity 410 may be formed of a clear material such as plastic rather than being formed of an atmospheric void.

FIGS. 7-10 illustrate an embodiment of a fixture assembly that includes a plurality of light sources disposed adjacent a light reflection cavity on exterior radial sidewall and circumferential sidewall of a wall fixture nut and also spaced apart from a wall fixture nut for transmission of diffuse light through a spa wall. The spa fixture assembly 700 may have a fixture 705 that may be threadably coupled or otherwise fixedly attached to a wall fitting 110 that is itself coupled to a spa shell wall 115 by a wall-fitting nut 120. The clear gasket 125 may be disposed between the wall fitting 110 and the spa shell wall 115 and adjacent a light reflection cavity 710 to provide both a watertight seal and light transmission path between them. The light reflection cavity 710 may be defined by the volume encompassed by the wall-fitting nut 120, wall fitting 110, spa shell wall 115 and adjacent clear gasket 125. A portion of the light introduced into the light reflection cavity 710 is partially reflected by the wall fitting 110 for diffusion throughout the light reflection cavity for further receipt and transmission by the clear gasket 125 and wall fitting 110 past the spa shell wall 115. The transparent or semi-transparent (i.e., color pigmented or neutral-density filtered) threaded cap 200 is threadably seated in the wall fitting 110 to receive and transmit a portion of the light received from either the clear gasket 125 or clear wall fitting 110 or both. The decorative handle 205 may be coupled to the threaded cap 200.

A first light source, such as flexible LED strip 715, may be disposed on an exterior radial sidewall 720 of the wall-fitting nut 120, the exterior radial sidewall 720 being on a side of the wall-fitting nut opposite from the second inner circumferential portion 320. A second light source 725 may be disposed on an exterior circumferential sidewall 730 of the wall-fitting nut 120, the exterior circumferential sidewall 730 being on a side of the wall-fitting nut generally opposite from the interior radial seat illustrated in FIG. 1B. A third light source 740 may be coupled to a circumferential channel 735 of the wall fitting 110. The third light source 740 is may be directed toward the wall-fitting nut 120 and remainder of the wall fitting 110 in a direction generally aligned with the longitudinal axis (L) of the spa fixture assembly 700 so that a portion of its emitted light may be received by and transmitted through the wall fitting 110, through the light reflection cavity 710, through the clear gasket 125 and either into the transparent or semi-transparent threaded cap 200 or to a front side of the spa shell wall to accent the perimeter or decorative top of a spa fixture.

FIGS. 11-14 illustrate an embodiment of a spa fixture having a light reflection cavity formed between a wall-fitting nut and a wall fitting, with a plurality of LED lights extending into the light reflection cavity through respective LED ports. A spa fixture assembly 1100 may have a fixture 1105 that is threadably coupled to a wall fitting 1110 that is itself coupled to a spa shell wall 115 by a wall-fitting nut 1115. A light transmissive gasket such as clear gasket 125 may be disposed between the wall fitting 1110 and the spa shell wall 115 to provide a watertight seal and light transmission path between them. A light reflection cavity 1120 may be defined by the volume encompassed by the wall-fitting nut 1115, wall fitting 1110, and the spa shell wall 115 so that a portion of the light reflected by the wall-fitting nut 1115 is diffused within the light reflection cavity 1120 for receipt and transmission through the clear gasket 125 for more uniform transmission of the light past the spa shell wall 115. One or more flexible cables 1125 may be introduced into the light reflection cavity 1120 through a respective one or more cable ports 1130.

As seen more clearly in FIG. 13, positioning of each flexible cable 1125 and associated LED 1135 through each cable port 1130 is facilitated by a respective LED guide ramp 1140 that a sloping guide surface configured to guide an LED directed through the LED port to face a radial interior of the wall-fitting nut 1115. LED clips 1145 (FIG. 14) may also be provided to further secure each flexible cable.

FIGS. 15 and 16 illustrate one embodiment of one or more light sources disposed on a water side of the spa shell wall for presentation to, and diffusion within, a wall fitting, for diffusion of the light prior to introduction to the water side of a spa shell wall. The spa fixture assembly 1500 may have a fixture 1505 that is threadably coupled to a wall fitting 1510 that is itself coupled to a spa shell wall 115 by a wall-fitting coupler such as a wall-fitting nut 1515. A flexible disk 1520 may be seated or otherwise attached to a circumferential recess 1525 on a side of the wall fitting 1510 immediately adjacent to the water side 131 of the spa shell wall 115, with a light source such as an LED, or preferably, a plurality of LEDs 1600 spaced apart and affixed to the flexible disk 1520 to form an LED strip 1605 seated circumferentially in the circumferential recess 1525. In an alternative embodiment, the flexible disk 1605 may be omitted and the plurality of LEDs 1600 seated directly in the circumferential recess 1525 or may be injected molded directly into the wall fitting 1510 to extend circumferentially about the wall fitting 1510 adjacent the water side 131 of the spa shell wall 115. The wall fitting 1510 may be formed of light transmissive material such as clear plastic to receive and transmit or partially diffuse light emitted from the LEDs 1600. A threaded cap 1530 may be threadably seated in the wall fitting 1510. A reflector shield 1535 may be provided within an interior of a handle such as diverter handle 1540 to reflect received light back to the wall fitting 1510 for transmission out the side of the wall fitting 1510 to adjacent the spa shell wall 115 thus creating a decorative diffused light about a perimeter of the spa fixture assembly 1500. The diverter handle 1540 may be configured to actuate an interior valve (not shown) in the jet body 1610.

Figure 17:
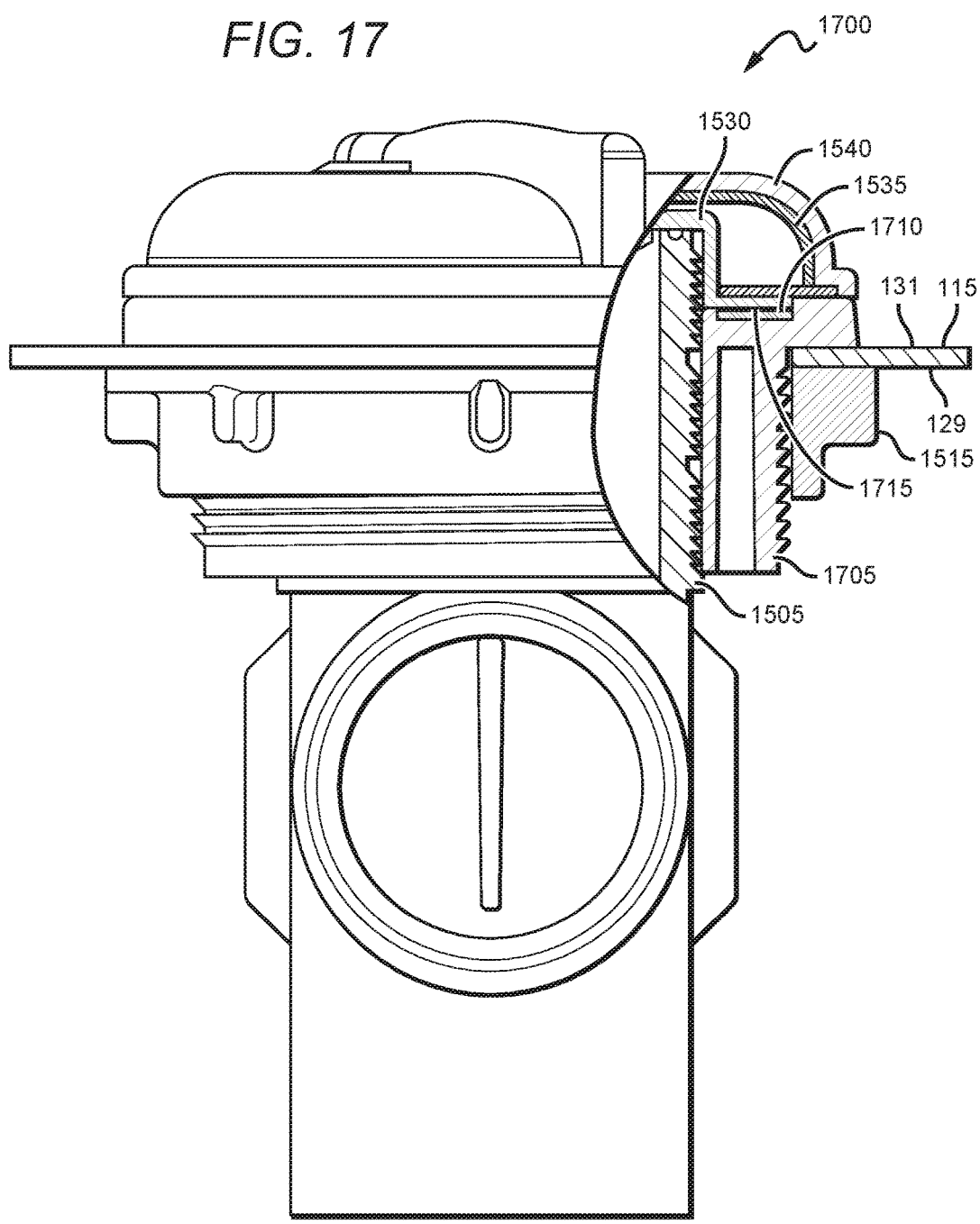
FIG. 17 is a partial cutaway view of another embodiment of a spa fixture having a light source disposed between a wall fitting and a reflector shield.
Figure 18:
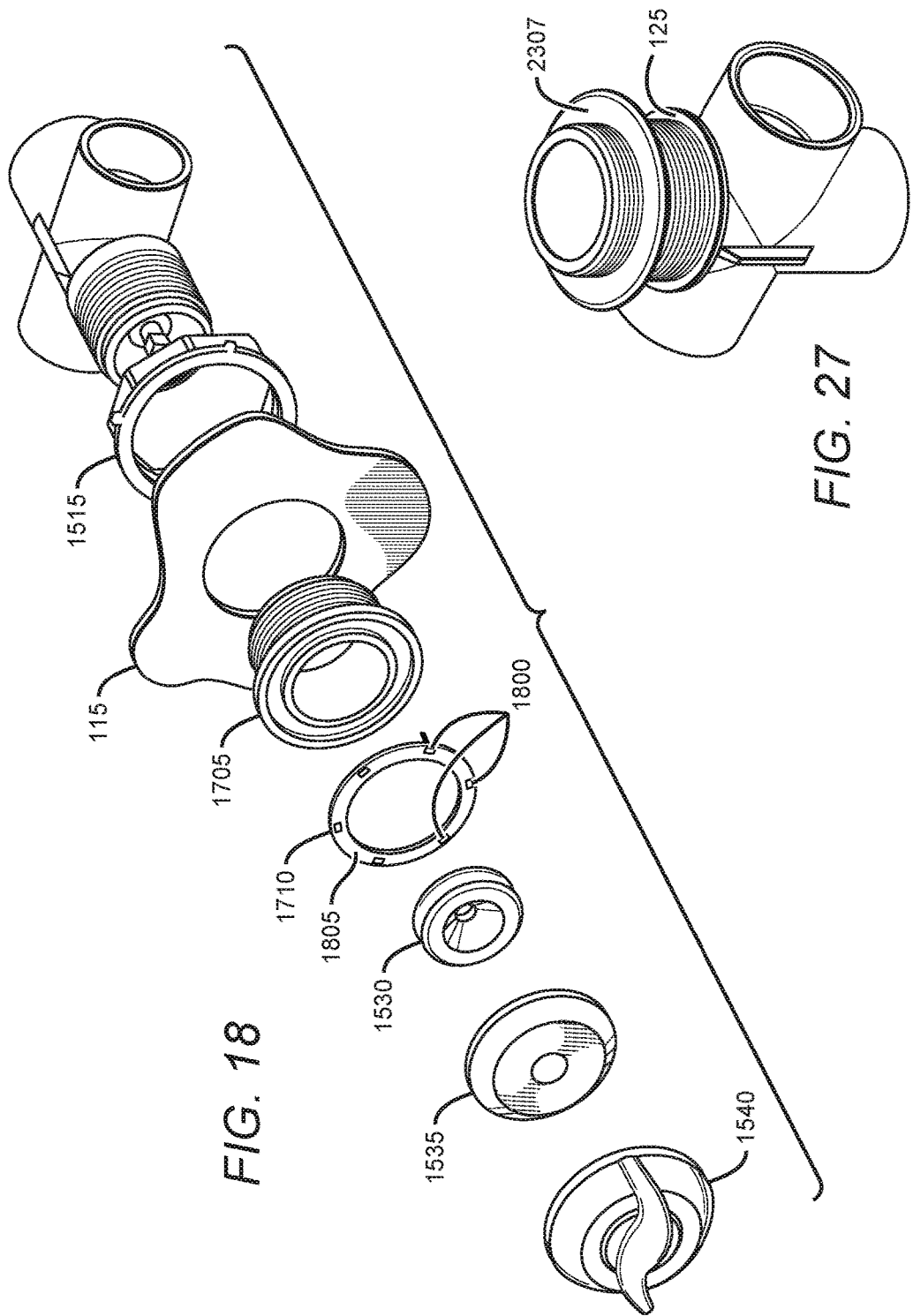
FIG. 18 is an exploded perspective view of the fixture illustrated in FIG. 17.
Figure 19:
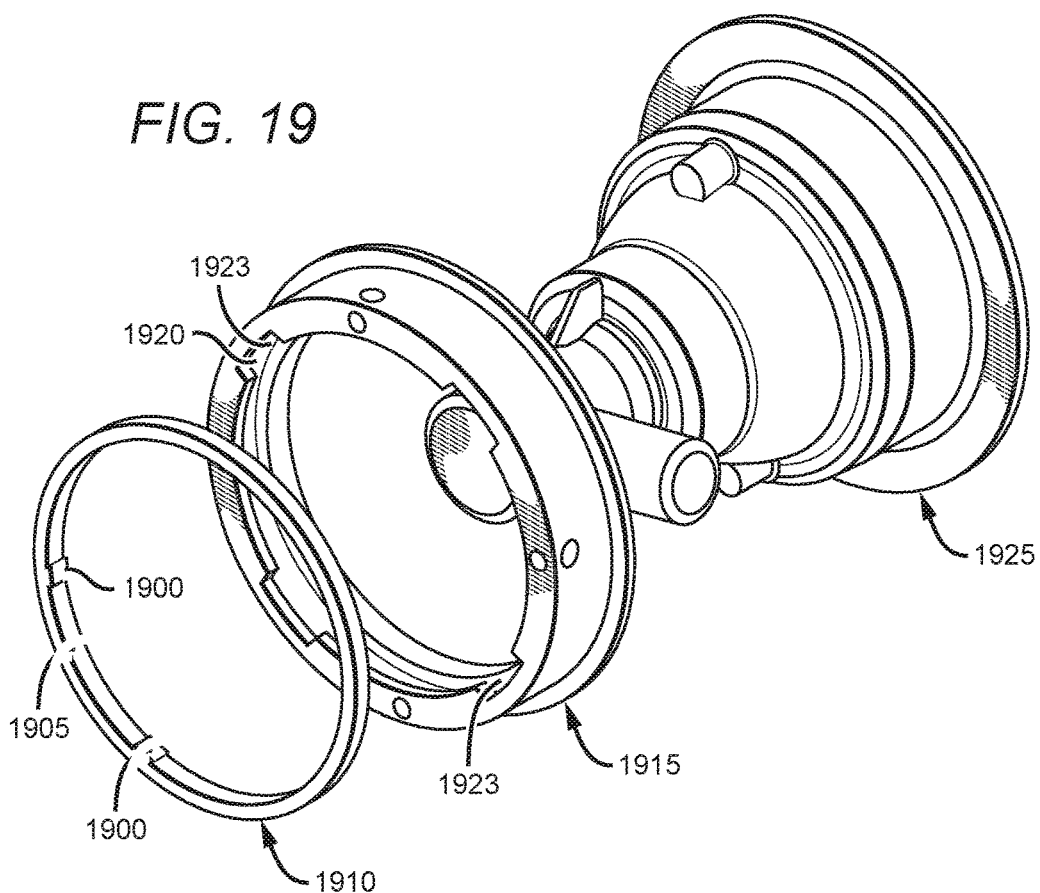
FIGS. 19 and 20 are exploded perspective views of a one embodiment of a spa fixture assembly that has a light source seated on an interior circumference of a spa wall grommet.
Figure 20:
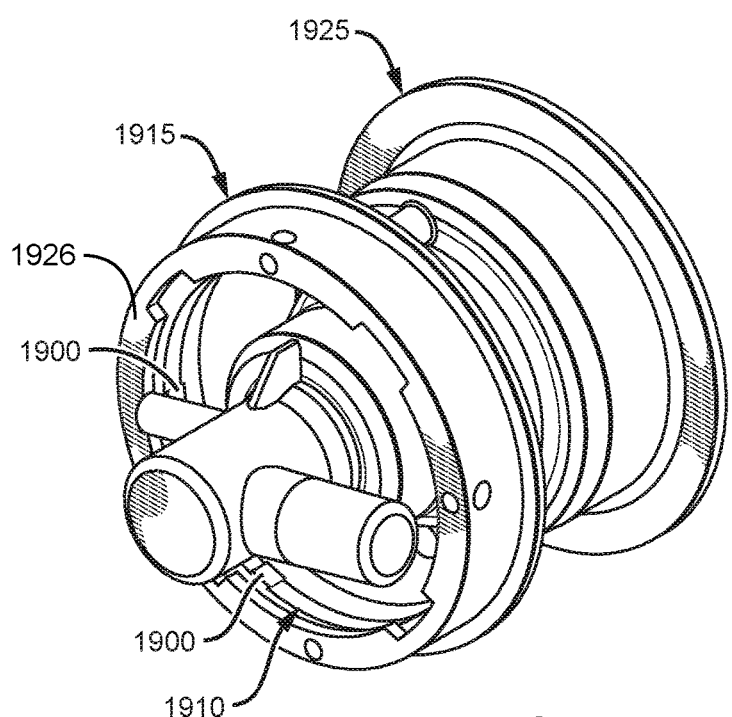
Figure 21:
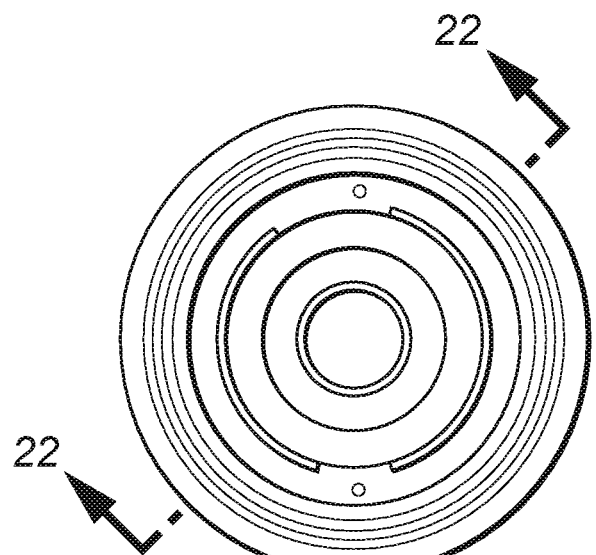
FIG. 21 is a cross-section view of the spa fixture assembly illustrated in FIGS. 19 and 20.
Figure 22:
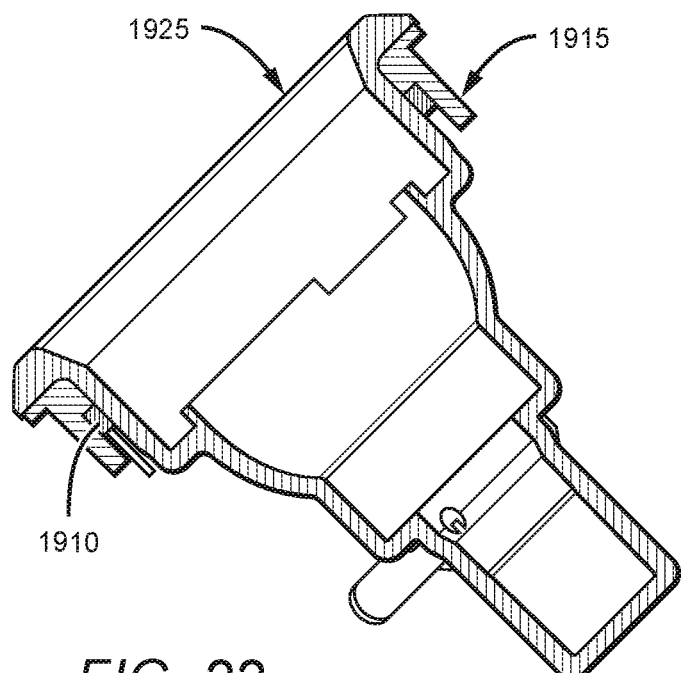
FIG. 22 is a top plan view of the spa fixture assembly illustrated in FIGS. 19 and 20.

FIGS. 17 and 18 illustrate another embodiment of one or more light sources disposed on a water side of the spa shell wall for presentation to, and diffusion within, a wall fitting, for diffusion of the light prior to introduction to the water side of a spa shell wall. The spa fixture assembly 1700 may have the fixture 1505 illustrated in FIG. 15 that is threadably coupled to a wall fitting 1705 that is itself coupled to the spa shell wall 115 by the wall-fitting nut 1515. A flexible disk 1710, similar in configuration to the flexible disk 1520 illustrated in FIG. 15, may be seated or otherwise attached to an interior circumference 1715 of the wall fitting 1705 to provide a plurality of LEDs 1800 that spaced apart and affixed to the flexible disk 1710 to form an LED strip 1805 disposed circumferentially about the wall fitting. In an alternative embodiment, the flexible disk 1710 may be omitted and the plurality of LEDs 1800 seated directly in the circumferential recess 1715. The wall fitting 1705 may be formed of transparent material such as clear plastic to receive and transmit or partially diffuse light emitted from the LEDs 1800. The threaded cap 1530 may be threadably seated in the wall fitting 1705. The reflector shield 1535 may be provided within the interior of the diverter handle 1540 to reflect received light back to the wall fitting 1705 for transmission out the side of the wall fitting 1705 to adjacent the water side 131 of the spa shell wall 115 thus creating a decorative diffused light about a perimeter of the spa fixture assembly 1700.

FIGS. 19-22 illustrate a spa fixture assembly that may be illuminated by a light source seated on an interior circumference of a spa shell grommet. A light source such as an LED, or preferably, a plurality of LEDs 1900 spaced apart and affixed to a flexible disk 1905 to form an LED strip 1910, is seated or otherwise attached to an interior circumference of a spa wall fitting that may be in the form of a spa shell grommet 1915. The LED strip 1910 may preferably be disposed in a circumferential recess 1920 of the grommet 1915 such as with an adhesive. In an alternative embodiment, the flexible disk 1905 may be omitted and the plurality of LEDs 1900 seated directly in the circumferential recess 1920. Access to the circumferential recess may be provided with a slot 1923. The spa shell grommet 1915 may be inserted into a spa shell wall (not shown) with a friction fit, an adhesive, or otherwise to receive a jet body 1925. The jet body 1925 may be fixedly attached to the spa shell grommet 1915 with a friction fit, adhesive or otherwise. The jet body 1925 and spa shell grommet 1915 are each preferably formed of clear or color pigmented plastic for transmission and diffusion of light emitted from the LED strip 1910. For example, light emitted from the LEDs 1900 may be presented to and received by the jet body 1925. A portion of the light may be reflected by the jet body 1925 or reflected back out of the jet body 1925 for introduction into an interior of the spa shell grommet 1915. In one embodiment, the spa shell grommet 1915 may be white (opaque) plastic and the jet body 1925 formed of material that is to be wholly (or in part) light transmissive such as clear or color pigmented plastic. In an alternative embodiment, the jet body 1925 may be another component that extends through the spa shell wall (not shown), such as a valve, air control panel, or suction fitting.

Figure 23:
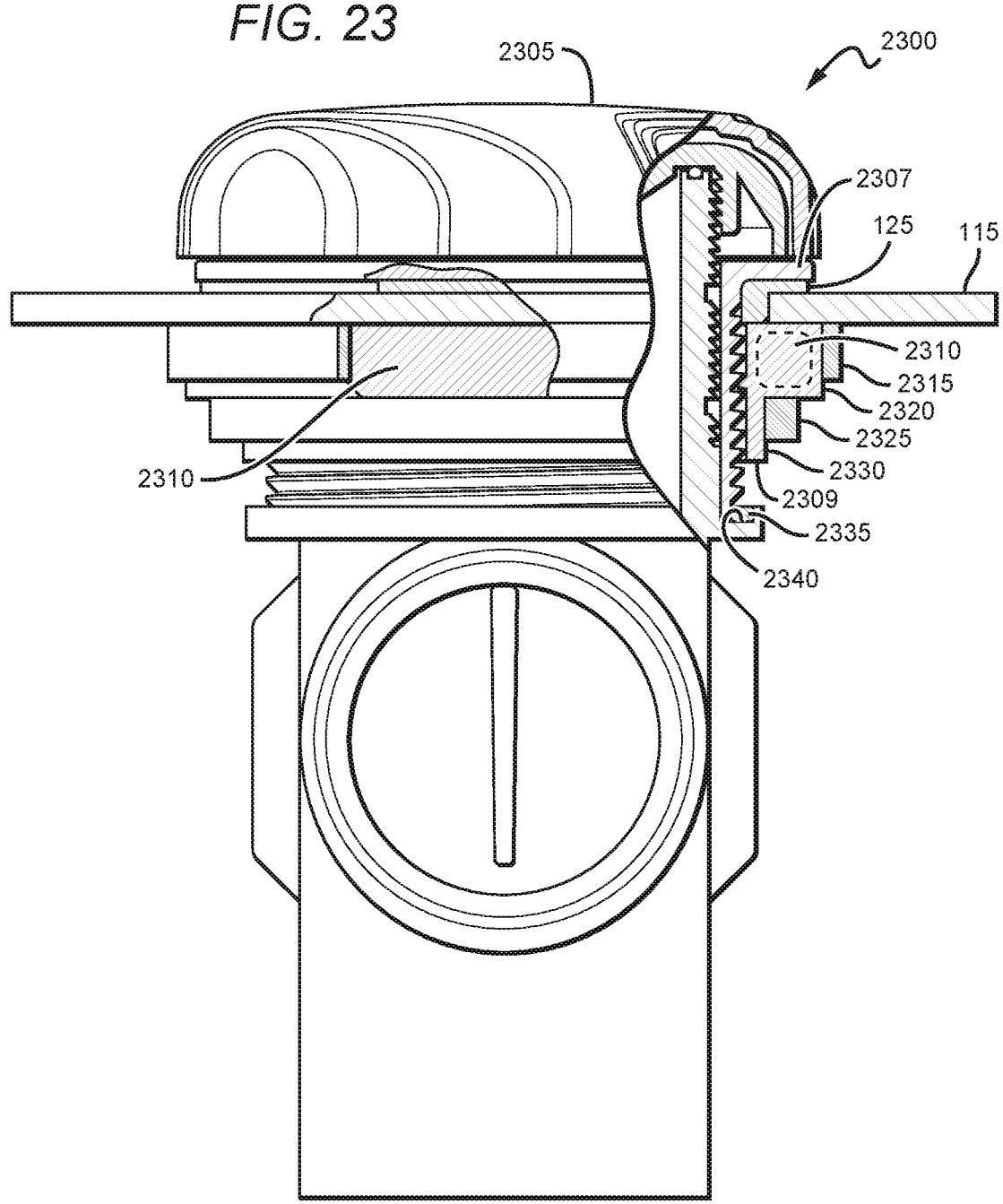

In an alternative embodiment of FIG. 23, the LED strip 1910 may be disposed on an exterior circumferential surface of the spa shell grommet 1915 (configuration not shown) so that light emitted from the light source is transmitted through the spa shell grommet 1915 for receipt and further transmission by the jet body 1925. In such an embodiment, the flexible disk 1905 of the LED strip 1910 may be configured as a reflector to reflect light back towards an interior of the spa shell grommet 1915 for more complete diffusion and presentation of emitted light to the jet body 1925. For example, once the emitted light is introduced into the spa shell grommet 1915, a portion of the light may be reflected internally, resulting in further diffusion of the light prior to its emission out of the spa shell grommet 1915. In a further embodiment, the individual LED's 1900 (or individual LED's disposed on a substrate) are disposed on an axial bottom surface 1926 of the spa shell grommet 1915 for transmission through the spa shell grommet 1915 for receipt and further transmission by the jet body 1925.

FIGS. 23-27 illustrate another embodiment of a fixture assembly that includes a plurality of light sources disposed on exterior circumferential surfaces and adjacent a wall fixture nut, with the wall fixture nut having a solid-core light reflection cavity, rather than a light reflection cavity having a void, for transmission of diffuse light through a spa wall. The spa fixture assembly 2300 may have a fixture 2305 that may be threadably coupled or otherwise fixedly attached to a wall fitting 2307 that is itself coupled to a spa shell wall 115 by a wall-fitting nut 2309. The clear gasket 125 may be disposed between the wall fitting 2307 and the spa shell wall 115 and adjacent an interior of the wall-fitting nut 2309 to define a light reflection cavity 2310 to provide both a watertight seal and light transmission path between them. The light reflection cavity 2310 may be defined by the solid-core volume encompassed by the wall-fitting nut 2309, wall fitting 2307, spa shell wall 115 and adjacent clear gasket 125. A portion of the light introduced into the light reflection cavity 2310 is partially reflected by the wall fitting 2307 for diffusion throughout the light reflection cavity 2310 for further receipt and transmission by the clear gasket 125 and wall fitting 2307 past the spa shell wall 115. The transparent or semi-transparent (i.e., color pigmented or neutral-density filtered) threaded cap 200 may be threadably seated in the wall fitting 2307 to receive and transmit a portion of the light received from either the clear gasket 125 or clear wall fitting 2307 or both. The decorative handle 205 may be coupled to the threaded cap 200.

A first light source, such as a flexible LED strip 2315, may be disposed on a first exterior side 2320 of the wall-fitting nut 2309. A second light source 2325 may be disposed on a second exterior side 2330 of the wall-fitting nut 2309. A third light source 2335 may be coupled to a circumferential channel 2340 and spaced apart from the wall-fitting nut 2039 but directed toward the wall-fitting nut 2309 and remainder of the wall fitting 2307 so that a portion of its emitted light may be received by and transmitted through the wall fitting 2307, through the light reflection cavity 2310 and either into the transparent or semi-transparent threaded cap 200 or out adjacent to the fixture 2305.

FIGS. 28-30 illustrate another embodiment of spa shell wall grommet (also see FIGS. 19-22) for use in a fixture assembly that has a light reflection cavity for transmission of diffuse light through a spa shell wall. A light transmissive wall fitting such as a spa shell wall grommet 2800 may extend through the spa shell wall 115 between the water side 131 to the backside 129. A plurality of lights 2805 may be spaced circumferentially within a circumferential recess 2810 of the grommet 2800 on a side of the spa shell wall grommet 2800 that extends from the backside 129 of the spa shell wall 115. In the present embodiment, the plurality of lights 2805 may be introduced into or accessed from the circumferential recess 2810 either through a grommet sidewall diagonal slot 2900, grommet sidewall diagonal port 2905 or grommet side wall vertical port 2910 that each extend from an exterior side 2915 of the spa shell wall grommet 2800 into the circumferential recess 2810.

While various implementations of the application have been described, it will be apparent to those of ordinary skill in the art that many more embodiments and implementations are possible that are within the scope of this invention.

We claim:
1. A spa fixture lighting system, comprising:
   a light transmissive grommet configured to extend through a spa shell wall from a water side to a backside, the light transmissive grommet having a light reflection cavity;
   a plurality of lights disposed in the light reflection cavity of the light transmissive grommet; and
   a spa fixture seated in the light transmissive grommet with a first friction fit;
   wherein the first friction fit provides the light transmissive grommet with a second friction fit with the spa shell wall.
2. The system of claim 1, wherein the spa fixture is a jet body.
3. The system of claim 1, wherein the spa fixture is a diverter valve.
4. The system of claim 1, wherein each light of the plurality of lights is spaced circumferentially about a longitudinal axis of the light transmissive grommet.
5. A spa fixture lighting system, comprising:
   a light transmissive grommet configured to extend through a spa shell wall from a water side to a backside; and
   a spa fixture extending through the spa shell wall and seated in the light transmissive grommet with a first friction fit;

wherein the first friction fit provides the light transmissive grommet with a second friction fit with the spa shell wall.

6. The system of claim 5, wherein the spa fixture is a jet body.

7. The system of claim 5, wherein the spa fixture is a diverter valve.

8. The system of claim 5, wherein the spa fixture is formed of at least one of: a color pigmented plastic and a clear plastic.

9. The system of claim 5, further comprising a plurality of lights.

10. The system of claim 9, wherein the plurality of lights are disposed on at least one of: a flexible disk, a flexible ring, and a flexible cable.

11. The system of claim 9, further comprising a plurality of ports extending into the light transmissive grommet.

12. The system of claim 11, wherein each light of the plurality of lights extends into a respective port of the plurality of ports, and wherein each light of the plurality of lights is an LED port.

13. The system of claim 12, wherein the plurality of LED ports comprise at least one of: a grommet sidewall diagonal slot, a grommet sidewall diagonal port, and a grommet sidewall vertical port.

14. The system of claim 12, further comprising:
an interior circumferential mating surface on an interior circumferential side of the light transmissive grommet.

15. A spa fixture lighting system, comprising:
a grommet for extending through a spa shell wall with a first friction fit;
said grommet configured to transmit light from a light source; and
a spa fixture for extending through the spa shell wall, the spa fixture configured for seating in the grommet with a second friction fit.

16. The system of claim 15, wherein the light source is disposed on the grommet.

17. The system of claim 15, wherein the grommet is a light transmissive grommet configured to transmit light from the light source.

18. The system of claim 15, wherein the light source comprises a plurality of lights.

19. The system of claim 18, wherein each light of the plurality of lights is spaced circumferentially about a longitudinal axis of the grommet.

20. The system of claim 18, wherein the plurality of lights are disposed on at least one of: a flexible disk, a flexible ring, and a flexible cable.

21. The system of claim 15, wherein the light source is disposed on an axial bottom surface of said grommet.

22. The system of claim 15, wherein said grommet comprises a plurality of holes along an axial bottom surface of said grommet.

* * * * *

UNITED STATES PATENT AND TRADEMARK OFFICE
CERTIFICATE OF CORRECTION

PATENT NO. : 10,378,707 B2
APPLICATION NO. : 16/160662
DATED : August 13, 2019
INVENTOR(S) : Jason W. Hillyard and Luis D. Fuentes Page 1 of 1

It is certified that error appears in the above-identified patent and that said Letters Patent is hereby corrected as shown below:

In the Specification

Column 9, Line 26, the text "In an alternate embodiment of FIG. 23, the LED strip" should read "In the alternate embodiment of FIGS. 19-22, the LED strip"

Signed and Sealed this
Twenty-first Day of April, 2020

Andrei Iancu
*Director of the United States Patent and Trademark Office*